United States Patent [19]

Chow et al.

[11] Patent Number: 5,090,002
[45] Date of Patent: Feb. 18, 1992

[54] POSITIONING SYSTEMS EMPLOYING VELOCITY AND POSITION CONTROL LOOPS WITH POSITION CONTROL LOOP HAVING AN EXTENDED RANGE

[75] Inventors: William W. Chow; Alan A. Fennema; Ian E. Henderson; Ronald J. Kadlec, all of Tucson, Ariz.

[73] Assignee: International Business Machines Corporation, Armonk, N.Y.

[21] Appl. No.: 320,197

[22] Filed: Mar. 7, 1989

[51] Int. Cl.⁵ .................................. G11B 7/085
[52] U.S. Cl. ...................... 369/44.28; 369/44.29; 369/32
[58] Field of Search ............... 369/32, 44.25, 44.27, 369/44.28, 44.29, 44.31, 44.32, 44.35, 33, 44.34, 43; 360/78.01, 78.04, 78.05, 78.06, 78.07, 78.08, 78.09, 73.04, 77.08

[56] References Cited

U.S. PATENT DOCUMENTS

| | | | |
|---|---|---|---|
| 2,717,979 | 9/1955 | Gardiner | 318/19 |
| 2,800,769 | 7/1957 | Newell | 318/592 |
| 2,843,841 | 7/1958 | King et al. | 340/173 |
| 3,458,785 | 7/1969 | Sordello | 360/77 |
| 3,473,164 | 10/1969 | Jensen | 340/173 |
| 3,924,063 | 12/1975 | Simons | 369/44 |
| 3,924,268 | 12/1975 | McIntosh et al. | 360/78 X |
| 4,032,984 | 6/1977 | Kaser et al. | 360/77 |
| 4,103,314 | 7/1978 | Case | 360/78 |
| 4,191,981 | 3/1980 | VanWinkle | 360/99 |
| 4,217,612 | 8/1980 | Matla et al. | 360/78 |
| 4,268,785 | 5/1981 | Svendsen | 318/620 |
| 4,333,117 | 6/1982 | Johnson | 360/78 |
| 4,425,043 | 1/1984 | Van Rosmalen | 356/375 |
| 4,513,332 | 4/1985 | Merritt et al. | 360/77 |
| 4,561,081 | 12/1985 | Janssen et al. | 369/45 |
| 4,627,039 | 12/1986 | Meyer | 369/44 |
| 4,694,229 | 9/1987 | Cormack | 318/561 |
| 4,839,876 | 6/1989 | Fennema | 369/44.29 R |

Primary Examiner—Roy N. Envall, Jr.
Assistant Examiner—Hung Dang
Attorney, Agent, or Firm—H. F. Somermeyer

[57] ABSTRACT

A position servo system has a position loop and a velocity loop. The position loop controls the stop-lock condition and provides for movement control within a range about the stop-lock position. The velocity circuit is employed for movements outside of the range of the position servo circuit. When the velocity servo's loop is being used, a compare circuit compares the servo drive signal from the velocity circuit with a signal generated by the position servo loop which is tracking the velocity servo loop. When the compare circuit finds that the servo drive signals have equal amplitudes, then the velocity servo loop is disconnected from an actuator with the position servo loop then connected to the activation for completing the movement to a desired or target stop-lock position. The above-indicated servo system controls a topping or fine actuator carried on a carriage moved by a coarse actuator. The fine and coarse actuators move along the same axis and transverse to movement of any work element, such as a record storage disk. The coarse actuator is continuously slaved to the positioning of the topping or fine actuator. A relative position sensor disposed intermediate the fine and coarse actuators supplies a position error signal for enabling the coarse actuator to continuously follow the fine actuator. Feed forward signals are supplied from the fine actuator to the coarse actuator. A preferred embodiment is shown using an optical disk environment.

59 Claims, 3 Drawing Sheets

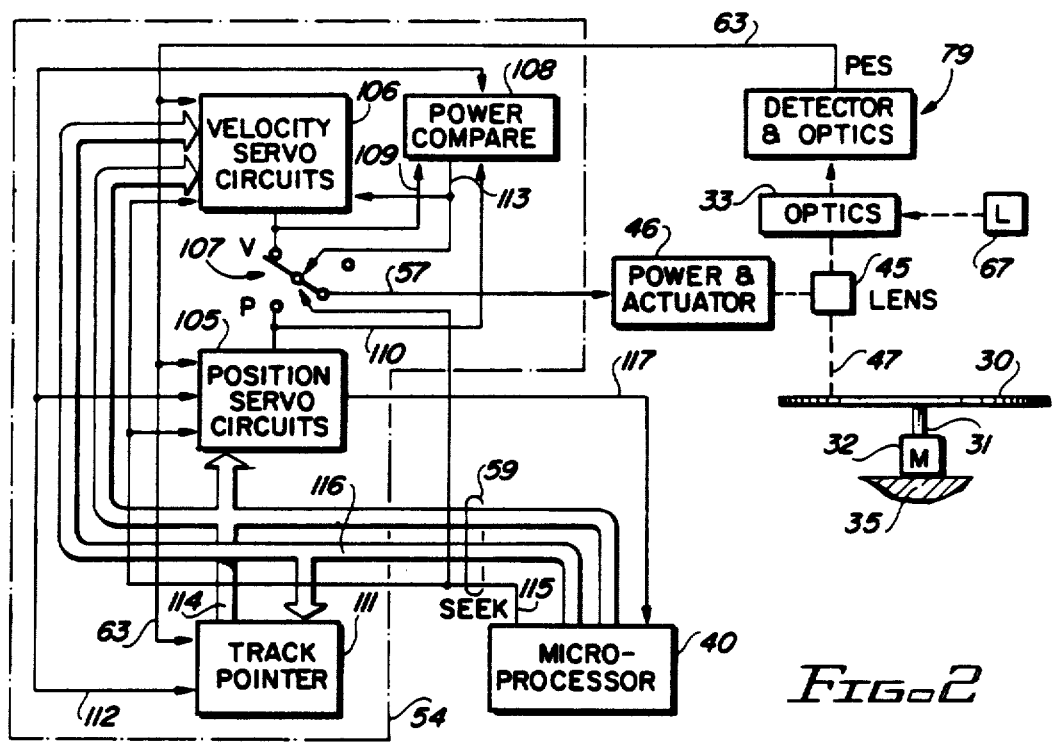
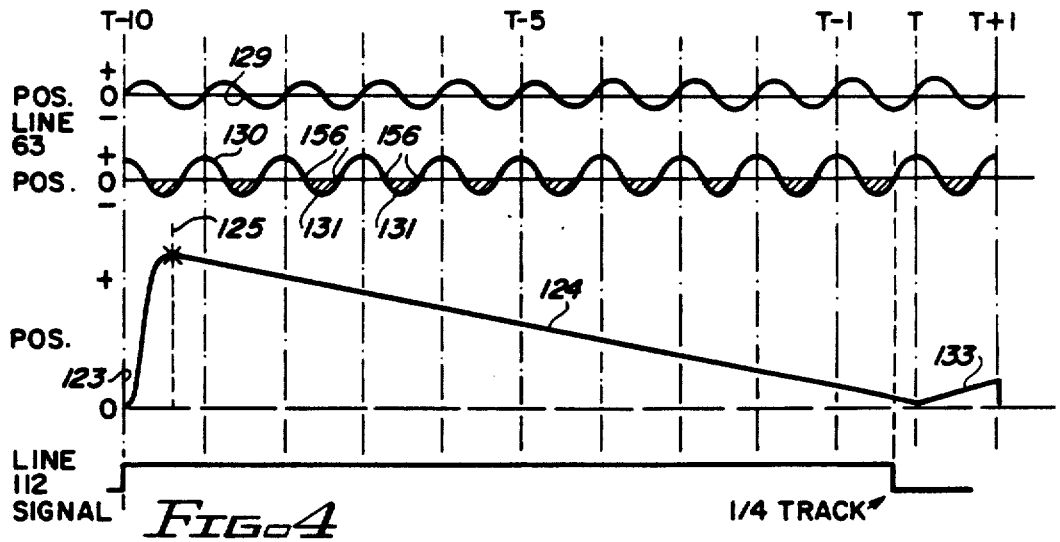
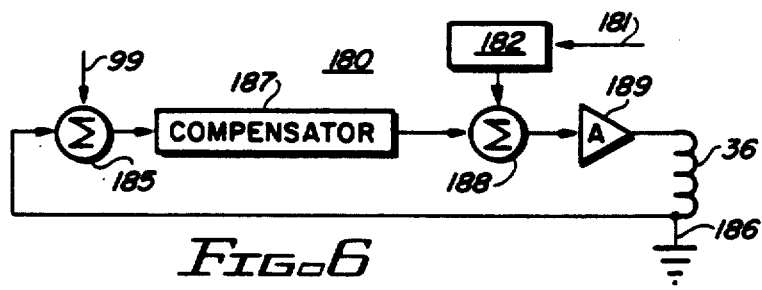

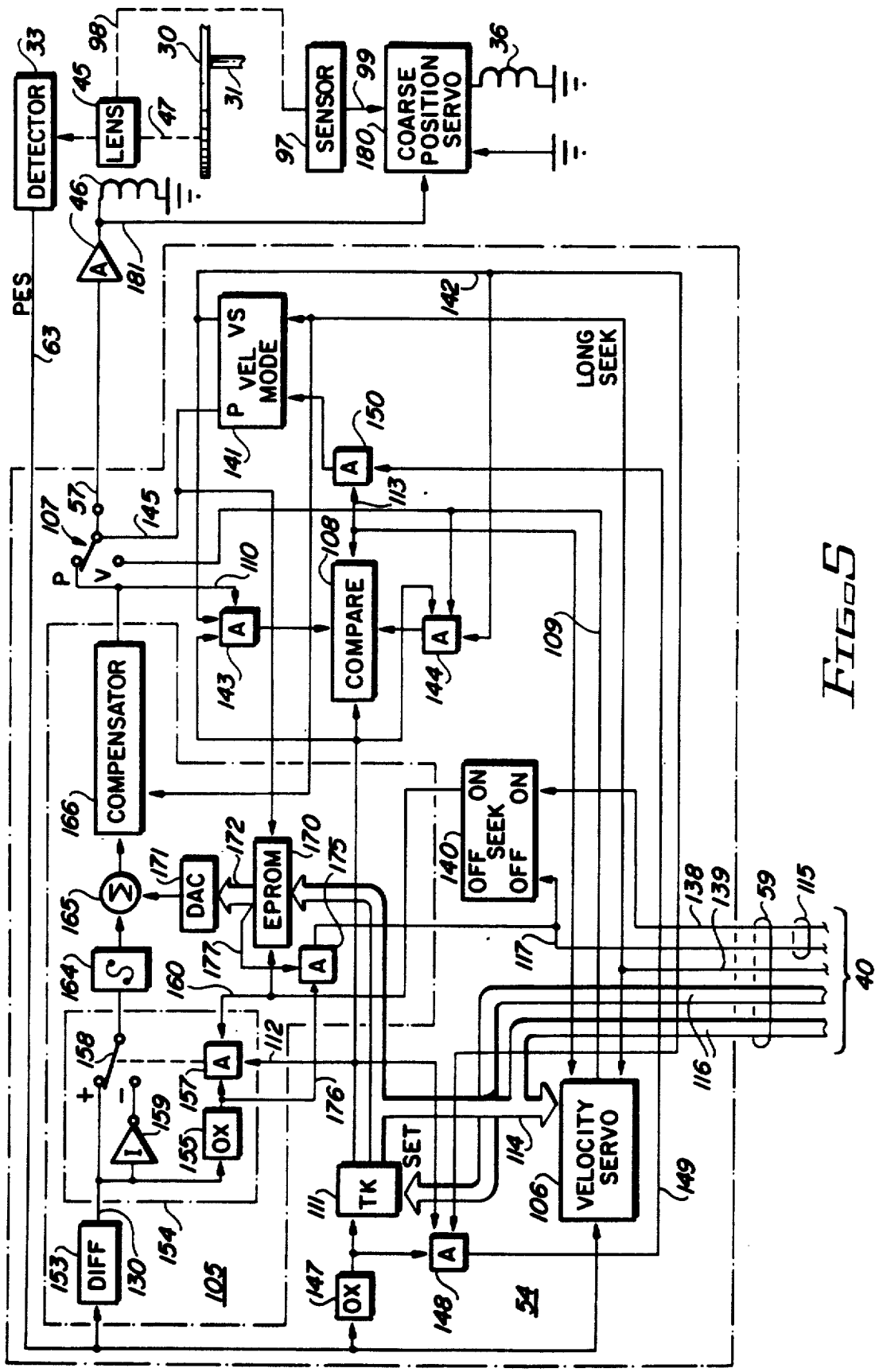

POSITIONING SYSTEMS EMPLOYING VELOCITY AND POSITION CONTROL LOOPS WITH POSITION CONTROL LOOP HAVING AN EXTENDED RANGE

DOCUMENT INCORPORATED BY REFERENCE

Co-pending commonly assigned application for patent Fennema, Ser. No. 123,675, filed Nov. 23, 1987 (TU987004) shows a position servo circuit preferably used with the present application.

BACKGROUND OF INVENTION

1. Field of the Invention

The present invention relates to position control systems; more particularly, position control systems having particular advantages when used in record storage disk recording and player apparatus.

2. Discussion of the Prior Art

Transducer positioning systems, particularly those used with magnetic or optical disk recording and player apparatus, have used a so-called velocity loop for long transducer motions, termed seeks, i.e., seeks traversing a large number of concentric circular record tracks. The velocity positioning servo mode is optimally switched to a track-following positioning servo mode at one-quarter track pitch from a target track. Such a track-following control may be compared to a "stop-lock" positioning control in other applications of positioning control systems. The track-following position servo then positions the transducer to faithfully track or follow the target track. In a subsequent seek operation, the track-following position loop is interrupted to return to either a velocity loop, a second positioning loop, or an open loop "bang-bang" servo for moving the transducer to yet another target track. It has been found that when the inter-track spacing is reduced to obtain higher track densities, then overshoot and track-settling problems become more acute when the servo mode is switched from velocity mode to track-following mode at the one-quarter track pitch from the target track. Accordingly, it is desired to provide for a more reliable and faster transition from velocity to positioning servo mode which results in faithful yet rapid track-following mode for carried signal transducers.

Many optical recorders have a goal of high performance at low cost. Accordingly, a so-called fine servo or fine actuator is carried upon a head-carrying arm which is moved by a coarse actuator. Typically, the fine actuator has high frequency response characteristics and provides for rapid and short distance positioning of the transducer with respect to a track being followed or for moving from one track to a second target track, which may be an adjacent track. The coarse servo which positions a relatively large mass head-carrying head arm, as well as the fine actuator, typically has frequency characteristics for handling the longer moves for optimizing the relationship for top performance between the fine and coarse actuators. The servo systems provide for relative positioning of the fine actuator with respect to the coarse actuator to a central or reference position. Such arrangements have been colloquially called "piggy back" carriage servo systems.

The application of such a "piggy back" carriage system is not limited to disk recorders. Actually, the concept was established many years ago for a pattern following or template-controlled coarse-fine positioning servo mechanism. Such an arrangement enabled higher production rates of a pattern controlled machine, such as welding machines or cutting machines. The carried fine actuator rapidly responds to sharp changes in the pattern such that the welding or cutting operation faithfully follows the guiding pattern template while only overcoming minimal inertia of the pattern controlled machine mechanisms. Gardiner, U.S. Pat. No. 2,717,979 shows such an arrangement. Gardiner teaches that the fine actuator, which Gardiner terms a topping servo, is controlled by the absolute positioning of the pattern template; while the coarse servo (called the main servo by Gardiner) is slaved to (always follows) the positioning of the topping servo. This arrangement means that the rapid responding topping servo controls the pattern controlled machine while the main servo follows the motions of the topping servo for maintaining the topping servo in an optimumal position with respect to the main servo controlled carriage; thereby maximizing the range of operation of the topping servo. The Gardiner positioning servo arrangement is also shown in Meyer, U.S. Pat. No. 4,627,039.

McIntosh et al., U.S. Pat. No. 3,924,268 and Merritt et al, U.S. Pat. No. 4,513,332 show magnetic disk recorders having piggy-back arrangements which are servo position controlled for optimizing the relative position of the fine actuator with respect to the coarse actuator. Simons, in U.S. Pat. No. 3,924,063 shows yet another coarse-fine control wherein the fine actuator is permitted to move over a predetermined minimum distance before a coarse actuator operation is invoked. Van Winkle in U.S. Pat. No. 4,191,981 shows fast and slow servo positioning mechanisms in a magnetic multiple disk recorder in which the slow servo mechanism is slaved to the fast servo mechanism; the latter arrangement is not a piggy-back arrangement.

Coarse and fine actuator controls are also widely found, particularly in magnetic disk recorders, for controlling a single carriage. In many instances, the fine control is a position responsive servo while the coarse or seek control is a velocity responsive servo. In some instances, both servo controls use position responsive controls. Examples of such coarse-fine controls of both types are shown in Svendsen U.S. Pat. No. 4,268,785; Kaser et al., U.S. Pat. No. 4,032,984; Case, U.S. Pat. No. 4,103,314; Sordello, U.S. Pat. No. 3,458,785; and Johnson, U.S. Pat. No. 4,333,117. Coarse and fine controls are also shown for optical recorders by van Rosmalen in U.S. Pat. No. 4,425,043 and by Janssen et al. in U.S. Pat. No. 4,561,081.

Not all positioning systems employ two separate servo mechanism control loops. An example of a single loop control for both track seeking and track-following is shown by Matla et al. in U.S. Pat. No. 4,217,612. Matla et al. employ a single position mode servo which includes an analog summer circuit, which during the track-following mode, has a control input of a reference potential. For track switching or seeking, a track increment generator supplies an input central signal to the summer circuit for actuating the loop to move the head or transducer carriage radially of a disk to another track position. In particular, see FIGS. 1 and 7 in this reference for a single loop controller which not only track follows, but uses the same track-following loop for moving a transducer in a seek operation over a plurality of concentric record tracks.

Newell, in U.S. Pat. No. 2,800,769, shows a gun-directing servo as yet another coarse-fine control. The fine control controls the hydraulic speed gear of the gun directing or laying servo similar to track-following in a disk recorder. A coarse control is responsive to an input signal for supplying a relatively large servo driving signal. This driving signal is coupled to a switch in the servo loop which switches between fine and coarse controls. When the coarse output signal is relatively large, the switch responds to the large signal amplitude to switch from the fine to the coarse control. When the output signal of the coarse control is reduced below a given threshold, then the switch returns the servo from the coarse control to the fine control. The gun-directing servo apparently has a 360 degree rotational range. The fine control positions the hydraulic speed gear within a 2½ degree error, which is about 0.7% of the positioning range. Based upon this small position error range of the fine control, it is believed that this fine control corresponds favorably to track-following in disk recorders. Another aspect of the Newell arrangement is a rate sensor which supplies a rate signal for assisting in deceleration of the hydraulic speed gear toward the target rotational position.

Optical recorders of both the record disk and record sheet (also termed tablet or chip) type have employed servo positioning wherein the light phase between adjacent tracks of optical indicia are reversed; that is, between adjacent record tracks 1 and 2 a black or opaque line extends for controlling the servo positioning. Between adjacent tracks 2 and 3, a transparent line extends between these adjacent tracks. Between tracks 3 and 4, the opaque line is repeated, etc. Track following uses a grey scale representing a mid point between the opaque and transparent track guiding lines. The reversal relationship of the opaque and transparent lines constitute a phase reversal in positioning control. Such an arrangement is shown by King et al. in U.S. Pat. No. 2,843,841. King et al. shows interrupting track-following mode for seeking to an adjacent track, also termed "track jumping". According to King et al., an open-loop pulse is applied to the positioning servo circuits for moving an optical radiation beam toward an adjacent target track. The open-loop pulse is designed to move the beam just over one-half way between two adjacent tracks. At this time, the phase of the servo circuits is reversed and the open loop pulse terminates. At this time, the track-following servo takes over the control of the radiation beam positioning for moving it to the target adjacent track in a track-following mode. Jensen, in U.S. Pat. No. 3,473,164, uses the arrangement for servo positioning shown in King et al., but uses a different servo control mechanism for moving the radiation beam from one track to an adjacent track. Reversal of the servo phase is also employed by Jensen for jumping the radiation beam to an adjacent track.

Even with all of the above variations of servo positioning of a transducer or work object with respect to a record element (disk, sheet or other work element), it is desired to provide for a more rapid and faithful servo positioning, particularly for data recorders having extremely high track densities. It is desired to provide for a more faithful so-called track "capture" such that the servo mode can switch from seeking to track-following more rapidly and reliably. A problem found in using high track densities is that as the transducer is radially moved slower and slower, the disk run-out caused by eccentricity of the disk with respect to its rotating spindle, causes radial motions of the track with respect to the slow-moving transducer. Accordingly, an engineering problem of faithfully measuring radial speed of the transducer with respect to the tracks (which are relatively radially moving inward or outward, depending upon eccentricity) becomes more difficult as well as faithful counting of the track crossings for precisely determining radial position with respect to the radially moving tracks, becomes more difficult. It is also desired to use a velocity servo loop for the long seeks.

SUMMARY OF THE INVENTION

A fine actuator/carriage is mounted for relative movement upon a coarse actuator/carriage for positioning movement along a path over a set of serially arranged positioning indicia. In a disk recorder, the positioning indicia can be record tracks on a disk surface. Such record tracks can be indicated by grooves in the record surface, opaque/transparent areas and the like. In every seek for traversing more than a certain number of indicia or tracks, a velocity servo circuit controls the motion of the fine actuator for rapidly positioning the fine actuator with respect to the positioning indicia. A position responsive servo circuit is also operatively connected to the fine actuator for maintaining position of an object (transducer or work element) carried on a fine actuator carriage with respect to a first position-indicating indicium on track in the positioning path. The position servo circuit includes short movement means for causing the fine actuator to move the carried object over not more than said first number of the positioning indicia to another indicium from the first indicium. The short movement means in the position servo circuit extends the range of operation of the position servo circuit from operating with but one indicium to a range of several indicia. Switching means are connected to the two servo circuits for selectively connecting the servo circuits to the fine actuator. For maintaining the fine actuator over the first indicium and for short seeks or movements to other indicia within a predetermined range, the position servo circuit is actuated. For longer seeks or movements over a large number of position indicia, the velocity circuit is actuated to move the work object or transducer over the indicia. When the work object is moving toward a target indicium over an indicium at about the outer extent of the range of operation of the position servo circuit with respect to a target indicium, the switching means switches the control of the positioning from the velocity servo circuit to the position servo circuit for completing the seek and to achieve later track capture to a target indicium at one-quarter pitch from the target indicium.

In a preferred mode, the position servo circuit is actuated for following the velocity servo circuit positioning control such that when the outer extremity of the position servo circuit range is reached, the servo drive signal from both the position and velocity servo circuits, are similar or identical. Switching from velocity to position mode control then becomes easy for enabling the position servo circuit to rapidly and faithfully finish the seek to the target indicia. In a particular embodiment, a comparator is connected to both position and velocity servo circuits for comparing their respective output servo drive signals. When the signals are identical, the comparator actuates the switching means to switch from the velocity mode to the position servo mode.

In another aspect of the invention, the velocity and position servo circuits operate to control a fine actuator carried by a coarse actuator. The coarse actuator is slaved to the positioning of the fine actuator through a position control servo circuit. The servo drive signal to the fine actuator is fed forward through a coupling circuit to the coarse positioning circuit for enabling more faithful following of the coarse actuator to the fine actuator for movements during seeking.

The foregoing and other objects, features, and advantages of the invention will be apparent from the following more particular description of preferred embodiments of the invention, as illustrated in the accompanying drawings.

BRIEF DESCRIPTION OF DRAWINGS

FIG. 2 is a simplified block and diagrammatic showing of a preferred implementation of the invention in the FIG. 1-illustrated recorder.

FIG. 4 is a graph showing operation of the FIG. 2-illustrated circuit switching from velocity to position modes of servo operation.

FIG. 5 is a block and diagrammatic detailed showing of FIG. 2-illustrated servomechanism.

FIG. 6 is a simplified block diagram of a coarse position circuit used in the FIG. 5 illustration.

DETAILED DESCRIPTION

Figure 1:
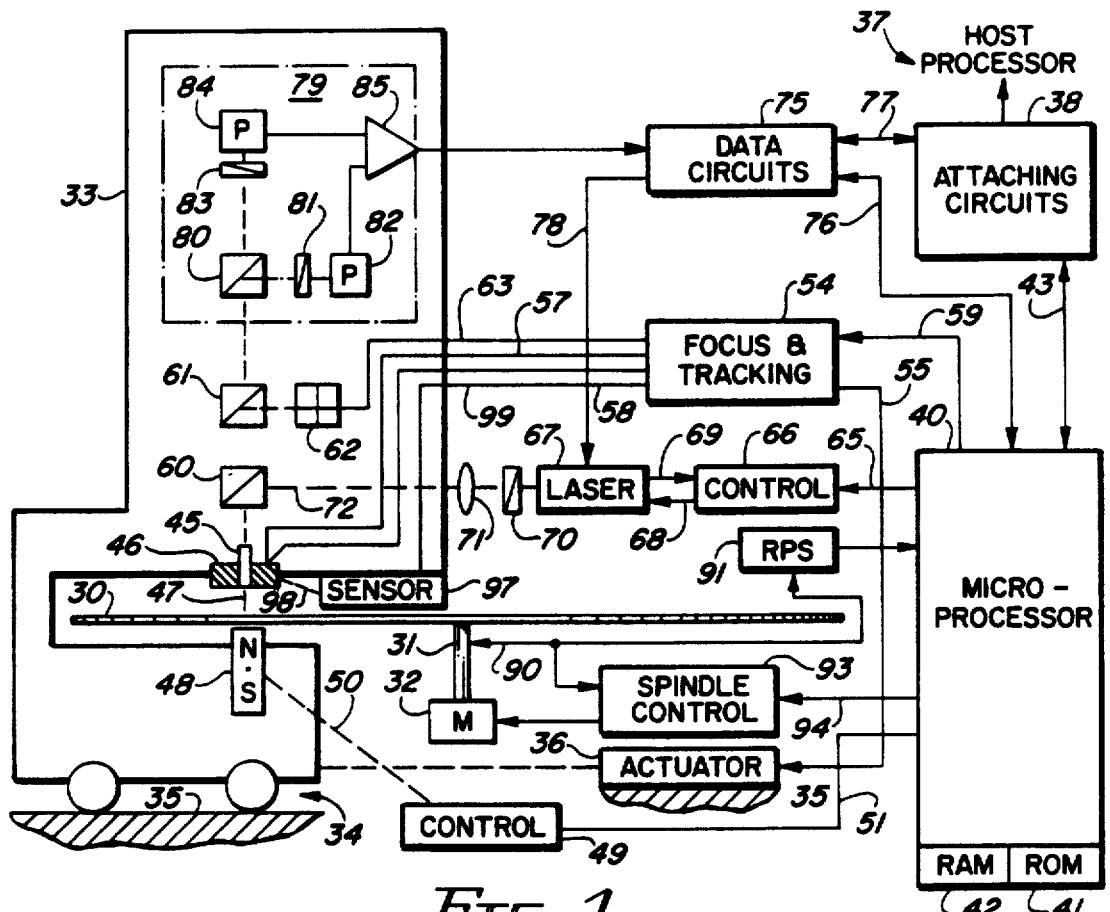
FIG. 1 is a simplified block and diagrammatic showing of an optical disk recorder in which the present invention may be advantageously employed.

Referring now more particularly to the appended drawing, like numerals indicate like parts of structural features shown in the various figures. Referring particularly to FIG. 1, a magnetooptic record disk 30 is mounted for rotation on spindle 31 by motor 32. The optical elements 33 on head arm carriage generally denoted by number 34 move radially of disk 30. A frame 35 of the recorder suitably mounts carriage 34 for reciprocating radial motions. The radial motions of carriage 34 enable access to any one of a plurality of concentric tracks or circumvolutions of a spiral track for recording and recovering data on and from the disk. Linear actuator 36, suitably mounted on frame 35, radially moves carriage 34 for enabling the track accessing. The recorder is suitably attached to one or more host processors 37, such host processors may be control units, personal computers, large system computers, communication systems, image processing processors and the like. Attaching circuits 38 provide the usual logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43.

Included in microprocessor 40 is a program, or microcode, stored in read only memory (ROM) 41 and a data and control signal storing random access memory (RAM) 42. This microcode enables microprocessor 40 to operate the recorder and for effecting other machine operations usually employed in signal recorders.

The optics of the recorder include an objective or focusing lens 45 mounted for focussing and tracking motions on head arm 33 by fine actuator 46. Actuator 46 includes mechanisms for moving lens 45 toward and away from disk 30 for focussing as well as radial movements for track-following and seeking movements. Numeral 47 denotes the two-way light path between lens 45 and disk 30. The coarse actuator continually follows the fine actuator for monitoring, as much as possible, the fine actuator at the radial center of the fine actuator's range of motion. In magnetooptic recording, magnet 48 provides a magnetic steering or bias field for controlling the remnant magnetization direction of a small spot on disk 30 illuminated by laser light from lens 45. The laser light spot heats the illuminated spot on the record disk to a temperature above the Curie point of the magnetooptic layer (not shown, but can be an alloy or rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates for moving the south pole adjacent to disk 30. Control 49 for magnet 48 is mechanically coupled to rotatable magnet 48 as indicated by dashed line 50 to control the write and erase directions. Magnet 48 may be replaced by an electric coil wherein the electrical current directions are reversed for write and erase operations. Microprocessor 40 supplies control signals over line 51 to control 49 for effecting reversal between the recording and erasing magnetic directions.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the actuator control by circuits 54 is exercised by control signals travelling over lines 57 and 58 respectively for focus and fine tracking and track switching actions of fine actuator 46.

The focus and tracking position sensing is achieved by analyzing laser light from laser 67 reflected from disk 30 over path 47, thence through lens 45, through one-half mirror 60 and to be reflected by half-mirror 61 to a so-called "quad" detector 62. Quad detector 62 has four photo elements which respectively supply signals on four lines collectively denominated by numeral 63 to focus and tracking circuits 54. Quad detector 62 also includes optics such as semicylindrical lens for optically processing the light beam for effecting focus error detection. Aligning one axis of the detector 62 with a track center line, track- following operations are enabled. Focussing operations are achieved by comparing the light intensities detected by diagonal photo elements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high intensity laser light beam capable of heating a spot on the medium to the Curie point for recording signals; in contrast, for reading recorded signals, the laser 67 emitted laser light beam is a much reduced intensity which does not heat the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value, depending on whether a write operation is occurring. Laser 67, a semiconductor laser such as a gallium arsenide diode laser, can be modulated by data signals so the emitted light beam represents the data to be recorded by such intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half-mirror 60 for being reflected toward disk 30 through lens 45. Data circuits 75 are prepared for recording the microprocessor 40 supplied suitable control signals over line 76. Microprocessor 40 in preparing circuits 75 is responding to commands for recording received from a host processor 37 via attaching circuits 38. Once data circuits 75 are prepared, data is transferred directly between host processor 37 over bus 77 into data circuits 75 through attaching circuits 38. Data circuits 75 also include ancillary circuits (not shown) relating to disk 30 format signals, error detection and correction and the like. Circuits 75, during a read or recovery detection, strip the ancillary signals from the readback signals before supplying corrected data signals over bus 77 to host processor 37 via attaching circuits 38. A data buffer (not shown) in data circuits 75 provides data buffering, as is well known for DASDs. During a reading operation, MO detector 79 converts the two phases of polarized light into data signals; the data signals are fed to data circuits 75.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half mirrors 60 and 61 to the data detection portion 79 of the head arm 33 carried optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photocell (P) 82 for supplying a suitable indicating signal to differential amplifier 85.

When the reflected light was rotated by a "south" or erased pole direction remnant magnetization, then polarizer 81 passes no or very little light resulting in no active signal being supplied by photocell (P) 82. The opposite operation occurs by polarizer 83 which passes only "south" rotated laser light beam to photocell (P) 84. Photocell 84 supplies its output signal indicating its received laser light to the second input of differential amplifier 85. The amplifier 85 supplies the resulting difference signal (data representing) to data circuits 75 for detection. The detected signals include not only data that is recorded, but also all of the so-called ancillary signals as well. The term data as used herein is intended to include any and all information-bearing signals, preferably of the digital or discrete value type. Other forms of information signal recording may be used.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to APS (angular or rotational position sensing) circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner.

For the FIG. 1-illustrated embodiment to follow the "Gardiner" servo positioning approach, sensor 97 is mounted on carriage 34 and is operatively coupled to fine actuator 46, as diagrammatically indicated by dashed line 98. The operative coupling is preferably an optical communication path. For example, fine actuator 46 carries an opaque/transparent flag or reflective/transparent flag. Sensor 97 shines a light toward the flag with the transmitted or reflected light being intercepted by photocells (not shown) of sensor 97, which faithfully indicate the relative radial position of fine actuator 46, with respect to carriage 34. Sensor 97 includes circuitry of known design that translate the intercepted light into a relative position indicating signal (RPS) traveling over electrical line 99 to focus on tracking circuits 54. The relative position signal on line 99 actuates focusing and tracking circuits 54 to slave the movement of head carriage 34 by actuator 36 through signals supplied over line 55, as will be later detailed.

Referring more particularly now to FIG. 2, focus and tracking circuits 54 operation is described with respect to the control of actuator 46 and the position controls of working object or lens 45 with respect to the record disk or work element 30. Focus and tracking circuits 54 include two track servo circuits, 105 and 106, respectively of the position and velocity servo type. Position servo circuit 105 not only controls actuator 46 to ensure that lens 45 faithfully follows (also termed a "stop-lock" mode) a record track on disk 30, but also has an extended range of radial operation for controlling lens 45 positioning over a plurality of record tracks of disk 30. For example, the extended range of position servo circuit 105 may be plus and minus ten tracks of a current track being followed. With respect to a current track being followed, for seeks of radiation beam 47 over a number of record tracks greater than ten, velocity servo circuit 106 controls actuator 46. Electronic switch 107 selectively transfers the servo drive output signals of circuits 105 and 106 over line 57 to fine actuator 46. Switch 107 is controlled such that on a long seek (more than ten tracks are traversed) the switch electrically connects input terminal V, which carries the velocity servo drive signal from line 109, to line 57. When radiation beam 47 is approximately ten tracks from the target track, then switch 107 disconnects terminal V from line 57 and reconnects terminal P to transfer the position servo circuit 105 servo drive signal over line 57 to actuator 46. This latter connection enables the position servo circuit 105 to utilize its extended range of operation to faithfully and quickly complete the long seek to the target track. Switching from terminal V to terminal P is performed when the drive signals from circuits 105 and 106 are approximately equal. To effect this switching synchronization, power compare circuit 108 receives the respective servo drive signals over lines 109 and 110 for comparing the RMS (root mean square) parameter of the signals. Such comparison is a well known technique and not described for that reason. When power compare circuit 108 detects approximate equality of the two servo drive signals, it emits a mode-changing signal over line 113 for actuating switch 107 to disconnect terminal V and reconnect terminal P to output line 57. Line 113 also extends to velocity servo circuit 106 for quiescing the signal compensation circuits therein, as is well known.

Compare circuit 108 is activated when laser beam 47 is approaching the outer extremity of the range of operation of position servo circuit 105. Such positioning is indicated by track counter 111 which was initially set by microprocessor 40 to indicate a direction of motion and number of record tracks (position indicia) to be traversed during the seek. Cable (electronic bus having a plurality of electrical circuit lines) 116 carries the distance to go and direction signals to track counter 111, as well as to velocity servo circuit 106. Velocity servo circuit 106 responds to the distance to go signal to set up a mode of operation optimizing the seek operation. Track counter 111 detects when the track count is approaching ten for supplying a compare circuit 108 activating signal over electrical line 112. Compare circuit 108 responds to the line 112 signal for comparing the servo drive signals on lines 109 and 110, as above described. Line 112 also extends to position servo circuit 105 for activating same to follow the positioning of radiation beam 47 as effected by velocity servo circuit 106; that is, circuits 105 now produce a servo drive signal for use by a compare circuit 108. Track counter 111 supplies the current track count over cable 114 to microprocessor 40 and position servo circuits 105 and 106. Circuits 105 and 106 use the track count in a usual manner.

A track seek operation is initiated under control of microprocessor 40. Microprocessor 40 supplies a seek initiate signal over line 115 which extends to switch 107 and circuits 105 and 106. For a short seek, the seek signal keeps switch 107 connected to the P terminal such that position servo circuit 105 controls the seek operation through its extended range of operation. The line 115 seek signal activates position servo circuit 105 in the short seek, while in a long seek quiesces a later shown signal compensation circuit in preparation for the track seek mode switch. The seek command also goes to velocity servo circuit 106 for activating same for a long seek, as will become apparent. All seeks are completed by position servo circuit 105 entering a track-following or stop-lock mode. When the track-following operation begins, circuit 105 supplies a seek complete signal over line 117 to microprocessor 40. Coordination of the operation of the track counter 111 and circuits 105 and 106 is through the position error signal supplied over line 63 from detector and optics 79. FIG. 4 illustrates the spatial synchronization of circuit operation using the PES signal not only for track-following and position servo seeking, but also track counting.

Figure 3:
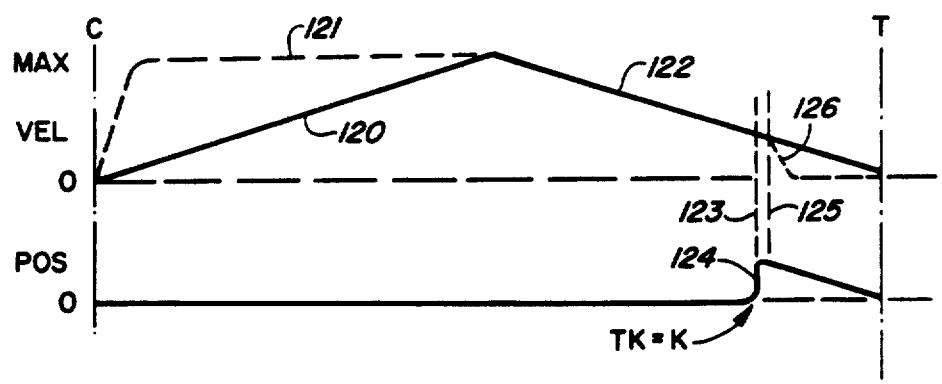
FIG. 3 is a graph illustrating a seek operation controlled by the FIG. 2-illustrated servo circuits.

FIG. 3 broadly illustrates a seek operation using both velocity and position servo circuits in a move from a current track centerline C to a target track centerline T. The graph is in the space domain; does not illustrate the signals in any time base. The beam 47 velocity or speed curve with respect to the recording surface of disk 30 is illustrated by line 120. Velocity, of course, begins at zero and proceeds to a maximum value whereas deceleration begins toward and follows line 122 to track T. The velocity servo circuit 106 servo drive signal is represented by dashed line 121 which effects the resultant velocity signal curve 120. During deceleration, numeral 122 designates that the velocity curve 120 and velocity servo circuit 106 servo drive signal are coincident. When track counter 111 contains a count TK equal to K (K is ten in the preferred embodiment), track counter 111 emits its compare enable signal over line 112 which corresponds to dashed line 123 in FIG. 3. At this time, the position servo circuit 105 servo drive signal POS is turned on as indicated by signal wave 124. Signal wave 124 follows the deceleration curve 122 at spatial line 125. Compare circuit 108, detecting that the RMS value of POS signal 124 is equal to the velocity servo circuit 106 servo drive signal VEL on line 109, actuates switch 107 to disconnect the V terminal from and connect the P terminal to actuator 46. Since the RMS amplitudes of the signals on line 109 and 110 are substantially identical, no transients are introduced into the operation of actuator 46. The power compare circuit 108 signal on line 113 also quiesces the operation of velocity servo circuits 106 as indicated in FIG. 3 by dashed line 126.

The detection of the position of beam 47 during the track seek is enabled by the line 63 (position—tracking—error signal) PES 129, as best seen in FIG. 4. PES 129 is shown in the spatial domain as a sine wave with positive going zero crossings at the various track center lines T-10 through T+1. The negative going zero crossing occurs at the midpoint between two adjacent track centerlines. Track counter 111 includes a zero crossing detector for counting the track crossings. Two zero crossings are counted for each traversal of a track. As later described, PES 129 is differentiated to create signal PES' 130. Of course, differentiation causes an effective phase shift of 90 degrees. For position servo circuit 105 to fully utilize the position error signal, the negative signal portions 131, also shaded, are inverted to become positive between the successive zero crossings 156 intermediate adjacent track centerlines. Zero crossings 156 correspond to the one-quarter point between adjacent tracks. POS signal 124 is enlarged in FIG. 4 for showing its relationship to PES 129 and PES' 130. Dashed line 123 of FIG. 3 is shown as being coincident with the centerline of track T-10, i.e., ten tracks to go to target track T, no limitation thereto intended. Dashed line 125 is shown as occurring asynchronously with respect to the PES 129, i.e., independent of the actual radial position of beam 47 with respect to any track centerline. If desired, the transition can be synchronized to such track centerlines. The line 112 signal is shown immediately below the signal POS 124. At the one-quarter track pitch position before beam 47 reaches the track centerline of track T, the line 112 signal is removed.

Position servo circuit 105 not only provides for terminating a long seek and track-following, but also provides for jumping one track, i.e., to an adjacent track as well as providing short seeks up to ten tracks from a current track. Numeral 133 designates such a single track jump from target track T to new target track T+1. The mode switching from track-following to jumping occurs at maximum amplitude of PES 124. Signal 133 ramps as a sawtooth wave with maximum amplitude at about the centerline of T+1 whereupon it relaxes to zero amplitude. The operation is such that the POS control signal 133 and a later described error signal which results in the servo drive closely follows signal 133 such that relatively small signal amplitudes are always present within position control circuit 105. See the Fennema application for patent, supra.

Referring now more particularly to FIG. 5, the detailed discussion is provided for a currently preferred embodiment of the invention. The microprocessor 40 seek command line 115 actually consists of two electrical signal lines, 138 and 139. Electrical line 138 carries a seek command irrespective of the length of the seek for setting seek latch or flip-flop 140. Seek latch 140 being set to the seek condition, conditions position servo circuit 105 for its extended range operation, as will become apparent. The line 139 signal identifies a seek longer than ten tracks, i.e. a long seek. The long seek signal travels over line 139 for setting velocity mode latch 141, which in turn actuates electronic switch 107 to move from the track-following P position to the long seek velocity drive position V. Line 139 also extends to velocity servo circuit 106 for enabling the circuit for performing a long seek operation. Circuit 106 can be of any velocity circuit design and is not described for that reason. The long seek signal activates circuit 106 to receive and respond to the commanded distance-to-go number of tracks supplied by microprocessor 40 over cable 116 as well as the current number of tracks to go as supplied by track counter 11 over cable 114. Velocity mode latch 141 supplies a first output indicating the velocity mode over line 142 as one condition of actuation of power compare circuit 108. To this end, analog AND circuits 143 and 144 are electrically interposed respectively between lines 110 and 109. The enablement of AND circuits 143 and 144 is completed by the line 112 signal (FIG. 4) for supplying an input to compare circuit 108, which operates as previously described.

Track counter 111 responds to the line 63 PES signal 129 through zero crossing detector (OX) circuit 147. OX circuit 147 supplies two pulses for each track crossing to track counter 111 which responds thereto for down counting the tracks to go. A direction signal derived from the detector (not shown) may be used for controlling the directional count of track counter 111. In the present embodiment, because of the extended range of operation of position servo circuit 105, the velocity of beam 47 with respect to the surface of disk 30 always has a sufficient velocity to accommodate run-out. The zero crossing signals from OX circuit 147 also are directed to AND circuit 148 for resetting velocity mode latch 141 to the position mode state. AND circuit 148 is enabled to pass a single zero crossing pulse by the line 112 signal and velocity mode latch 141 being set to the velocity mode state (VS). The AND circuit 148 output signal travels over line 149 thence through AND circuit 150, as enabled by the line 113 signal received from compare circuit 108, to reset velocity mode latch 141. This action by the connection over line 145 to electronic switch 107 actuates the switch to disconnect terminal V and line 109 from line 57 and reconnect terminal P and line 110 to line 57. Line 145 also extends to later described EPROM 170 within circuit 105.

The detailed operation and construction of position servo circuit 105 are next described. The line 63 PES signal 129 is differentiated by differentiator (DIFF) 153 to produce the PES' 130. PES' 130 goes to polarity reversing circuit 154. Circuit 154 includes zero crossing detector (OX) 155 which detects the zero crossings 156 of PES' 130. AND circuit 157 receives the zero crossing 156 indicating signals and when enabled by the seek signal on line 160 and the line 112 signal from track counter 111, actuates electronic switch 158 to disconnect the plus terminal from its output to signal integrator 164 and connect the minus terminal thereto. The plus terminal directly connects the output of differentiator circuit 153 to integrator 164. The minus terminal connects the output of differentiator 153 through signal inverter or polarity reversing amplifier 159 to integrator 164. Inverter 159 inverts the polarity of negative signal portions 131 of PES' 130. The unipolar PES' signal is integrated by integrator 164 then applied to analog summer circuit 165, thence compensator 166. Compensator 166 supplies the position servo circuit servo drive signal over line 110. Compensator 166 is designed, using known techniques, to enable maximum bandwidth with adequate stability margins, as is common in the servo art.

The control signal for summer 165 to be mixed with the position (tracking) error signal from integrator 164 is generated by a self-sequencing EPROM 170. EPROM 170 is activated by the line 145 signal indicating the position servo mode. Track counter 111 supplies the number of tracks to go to EPROM 170 over cable 114. When track counter 111 has a zero track count, then EPROM 170 causes position servo circuits 105 to be in a track-following mode. The line 160 seek signal also goes to EPROM 170 for ensuring that circuit 105 remains in the track-following mode in the absence of a seek signal irrespective of the numerical contents of track counter 111. EPROM 170 is programmed to generate a position drive signal in the digital form which is supplied over cable 172 to digital analog convertor (DAC) 171. DAC 171 in turn supplies the analog position command signal to summer 165. EPROM 170 includes an electronic table representing the desired position reference signals in digital form for each track count received from track counter 111. The generation of such tables in operations of EPROM are sufficiently well known so that detailed description may be dispensed with.

The seek complete signal to be supplied over line 117 to microprocessor 40 is generated by AND circuit 175. The one-quarter track position from target track T is indicated by the zero crossing signal carried over line 176 from OX 155. EPROM 170 supplies a signal over line 177 indicating that the position of beam 47 with respect tot rack T centerline is approaching the one-quarter track pitch position, as shown in FIG. 4. AND circuit 175 responds to the two signals to supply the seek complete signal over line 117 which not only goes to microprocessor 40 but also resets seek latch 140 to the off or non-seek condition. Line 177 signal from EPROM 170 corresponds to track counter 111 indicating to EPROM 170 that the number of tracks to go is unity, i.e., the next track is target track T.

Sensor 97 supplies its error signal EPR over line 99 to coarse position servo 180. Line 181 connects the servo drive signal at actuator 46 to coarse position servo 180 as a feed forward signal to ensure that coarse actuator 36 moves head carriage 34 in an optimum manner such that fine actuator 46 follows the center line of a track as closely as possible.

FIG. 6 is a simplified diagram of a coarse position servo circuit 180. Analog summer 185 receives the sensor 97 position error signal over line 99. The position error signal is compared with ground reference potential at ground point 186. The summer 185 error signal is supplied through compensator 187 to analog summer 188. Summer 188 combines the feed forward signal on line 181 with the compensated error signal and supplies a coarse position drive signal through amplifier 189 to coarse actuator 36. Circuit 182 is electrically interposed between line 181 and summer 188 for providing smoothing and amplitude translation of the line 181 carried signal from fine actuator 46.

While the invention has been particularly shown and described with reference to its preferred embodiments thereof, it will be understood by those skilled in the art that various changes in form and details may be made therein without departing from the spirit and scope of the invention.

What is claimed is:

1. In a position servo system having an actuator movably mounted on a support and carrying a transducer to be positioned over a predetermined travel path with respect to a signal storing member and being disposed in operative relationship to the signal storing element, the signal storing member having a plurality of spaced-apart position-indicating indicia along said travel path and being sensible by the transducer such that the transducer supplies a local position indication of the positional relationship of the transducer to any indicium currently being sensed, position error means being operatively connected to the transducer for receiving said indication and for supplying a position error signal indicative of a position of the transducer from a target indicium;

the improvement including, in combination:

a position servo circuit operatively connected to said error means and to the actuator for controlling the actuator to maintain the transducer in a predetermined relationship to an indicium currently being sensed by the transducer and upon command to move the transducer along said predetermined path to a first target indicium within a predetermined number of indicia from the current indicium, said predetermined number being greater than two;

a velocity servo circuit operatively connected to the error means and to the actuator for controlling the actuator to move the transducer a number of indicia from the current indicium greater than said predetermined number of indicia along said predetermined path toward a second target indicium; and switching means operatively interposed between said servo circuits and said actuator for enabling the velocity servo circuit to control the actuator for all movements of the transducer over indicia spaced from said second target indicium more than said predetermined number of indicia along the predetermined path and for switching control of the actuator from the velocity servo circuit to the position servo circuit when the transducer is not more than said predetermined number of indicia from said second target indicium.

2. In the position servo system set forth in claim 1, further including, in combination:

said position and velocity servo circuits respectively supplying servo drive signals to the actuator for controlling same; and said switching means, including signal compare means operatively coupled to said position and velocity servo circuits for separately receiving the respective servo drive signals and for comparing the amplitudes of said servo drive signals, when the amplitudes reach a predetermined amplitude relationship, then said compare means actuating the switching means for switching control from the velocity servo circuit to the position servo circuit as an indication that the transducer is not more than said predetermined number of indicia from said predetermined indicium.

3. The position servo system set forth in claim 2, wherein said switching means further includes proximity means operatively coupled to said position error means for receiving said position error signal and being responsive to the position error signal for indicating that the relative position of the transducer with respect to said second target indicium is approaching not more than said predetermined number of indicia from said second target indicium to actuate said compare means to begin comparing said servo drive signals; and said compare means including inhibit means for inhibiting comparison of the servo drive signals until said proximity means actuates said compare means.

4. In the position servo system set forth in claim 1, further including, in combination:

command means coupled to said switching means for supplying a seek command thereto and to said position and velocity servo circuits for supplying direction and number of indicia to be traversed in reaching one of said target indicia; and mode selection means in the command means responsive to a number of indicia to be traversed during a seek as being not more than said predetermined number of actuating the switching means to connect the position servo circuit to the actuator and disconnect the velocity servo circuit from the actuator, and being further responsive to the number of indicia to be traversed being greater than said predetermined number of indicia to actuate the switching means to initially connect the velocity servo circuit to the actuator and enabling the switching means for switching control to the position servo circuit from the velocity servo circuit when the working object is not more than said predetermined number of indicia from said target indicium.

5. In a position servo system as set forth in claim 4, wherein said predetermined number is greater than two indicia.

6. In a position servo system as set forth in claim 4, further including, in combination:

said switching means, including quiescing means operatively coupled to said position servo circuit for quiescing operation of said position servo circuit during the time the velocity servo circuit is controlling the actuator; and proximity means operatively coupled to said position error means for determining when said transducer is approaching an indicium which is not more than said predetermined number of indicia from said target indicium and being responsive to such approach for actuating the quiescing means to remove the quiescence of said position servo circuit for facilitating switching control of the actuator from the velocity servo circuit to the position servo circuit.

7. In a position servo system as set forth in claim 6, wherein said quiescing means further includes:
   a quiescing portion operatively connected to said velocity servo circuit and being responsive to the switching means switching control from the velocity servo circuit to the position servo circuit for quiescing operation of the velocity servo circuit.

8. In a position servo system as set forth in claim 4, wherein said position and velocity servo circuits separately supply respective servo drive signals to the actuator for controlling same; and
   compare means in said switching means operatively coupled to said position and velocity servo circuits for receiving the respective servo drive signals for comparing the energy value thereof for responding to the servo drive signals have an equal energy value for indicating that the transducer is said predetermined number of indicia from said second target indicium for actuating the switching means to switch control from the velocity servo circuit to the position servo circuit.

9. In a position servo system as set forth in claim 8, further including, in combination:
   proximity means in the switching means operatively coupled to said position error means for receiving the position error signal for indicating when the transducer is approaching the second target indicium and is nearing a one of said indicia spaced said predetermined number of indicia from said second target indicium for actuating said compare means to begin actively comparing the energy levels of said servo drive signals.

10. In a position servo system as set forth in claim 8, further including, in combination:
    quiescing circuit means in said switching means operatively coupled to said position and velocity servo circuits for detecting which of the servo circuits is currently not controlling the actuator for quiescing a one of the servo circuits which is not currently controlling the actuator; and
    being responsive to the proximity mans to activate the position servo circuit to generate its servo drive signal for use by said compare means even through not controlling the actuator.

11. In a position servo system as set forth in claim 1, further including, in combination:
    said position servo circuit including:
    an analog signal summer circuit for supplying a servo drive signal for controlling the actuator and having first and second inputs;
    the position servo circuit being connected to said transducer for receiving said local position indication;
    a signal differentiating circuit receiving said local position indication for differentiating same for supplying a differentiated local position indication;
    signal polarity reverse means electrically connecting the signal differentiating circuit to said summer circuit for transferring the differentiated local position indication to one input of the summer circuit;
    the reference potential means connected to the second input to said analog summer circuit for supplying a stop lock reference signal to said summer circuit for maintaining the transducer in a stop lock condition over one of said indicia;
    track movement control means for supplying a position servo control signal to said analog summer for replacing the positional reference signal for actuating the positions servo circuit to move the transducer within said predetermined number of indicia; and
    said command means further including a connection to said position servo circuit for actuating said track movement control means and said polarity reverse means for switching control of the actuator from the velocity servo circuit to the position servo circuit for synchronously reversing the polarity of the differentiated local position signal with respect to indicia crossings for maintaining a predetermined error signal as said servo drive signal from the position servo circuit to the actuator during position servo circuit controlling operations.

12. In a servo position system set forth in claim 11, including:
    means in the position servo circuit connected to said transducer for receiving the local position indication and being responsive to the local position indication indicating about one-quarter indicia spacing distance from said target indicium for stopping operation of said reverse means and said track movement control means for reestablishing a stop-lock condition over said target indicium.

13. In a position servo system set forth in claim 1, wherein said switching means includes:
    velocity means connected to the position error means and to the velocity servo circuit for measuring the relative velocity of the transducer to said signal storing member; and
    said velocity means having a velocity threshold for indicating a desired velocity of the transducer over said signal storing member as the transducer is said predetermined number of indicia from the target indicium and being operative to detect that said measured velocity is at said velocity threshold to indicate that said transducer is said predetermined number of indicia from said target indicium for actuating the switching means to switch control of the actuator from the velocity servo circuit to the position servo circuit.

14. In a position servo system set forth in claim 13, further including, in combination:
    proximity means in the switching means operatively coupled to said position error means for estimating that the transducer is not more than predetermined number of indicia from said target indicium; and
    said proximity means being coupled to the velocity means for activating the velocity means to begin measuring the velocity of the transducer with respect to the working element.

15. In a position servo system as set forth in claim 14, wherein said proximity means include:
    a further connection from said proximity means to the position servo circuit and said proximity means being operative to compare the operation of the position servo circuit with the operation of the velocity servo circuit and detecting that the operations are identical for indicating the velocity between the transducer and signal storing element is a velocity equal to said velocity threshold for indicating that said transducer is said predetermined number of indicia from said target indicium on the signal storing member.

16. In a position servo system set forth in claim 15, wherein said position error means includes:

a down counter having a count contents representative of a number of indicia to be traversed to reach a one of said target indicia operatively connected to the transducer for receiving said local position indication being responsive to said local position indication to down count as the transducer passes over indicia in traveling toward one of said target indicia and generating a count indicating the position error of the transducer with respect to the target indicium.

17. In a position servo system as set forth in claim 1, further including, in combination:

said position servo circuit including:

control means for controlling operation of the position servo circuit to move the transducer away from a current indicium by supplying a ramp signal beginning at a reference potential which represents a stop lock condition over said current indicium and increasing in amplitude representative of a distance between said current indicium and said target indicium and resetting the ramp to a reference potential upon reaching the target indicium, and further including means for supplying a ramp signal in response to the switching means beginning at a maximum amplitude and declining to said reference potential.

18. In a position servo system as set forth in claim 17, further including, in combination:

said position servo circuit including:

mode control means operatively connected to said transducer and said position error means for receiving the local position indication and the position error signal for indicating that the transducer is one-fourth a distance between two adjacent ones of said indicia from said target indicium for instituting a stop lock condition over the target indicium and terminating said ramp signals.

19. In a position servo circuit as set forth in claim 1, further including, in combination:

a data recording apparatus including said servo system and having a moveable optical transducer as said transducer, an optical record medium as said signal storing member; and a plurality of spaced apart record tracks on the optical record medium with each track being a one of said location indicia.

20. In the invention set forth in claim 19, further including, in combination:

a frame in the record apparatus;

said optical record medium being an optical data-storing disk mounted for rotation on the frame; indicium and increasing in amplitude representative of a distance between said current indicium and said target indicium and resetting the ramp to a reference potential upon reaching the target indicium, and further including means for supplying a ramp signal in response to the switching means beginning at a maximum amplitude and declining to said reference potential.

21. In the invention set forth in claim 20, further including, in combination:

coarse servo circuit connected to said moving means for controlling movements of the head carriage;

a relative position sensor on the head carriage and operatively connected to the transducer for indicating relative position of the transducer with respect to the head carriage;

said coarse servo being connected to the relative position sensor for receiving the signal therefrom for actuating the moving means to move the head carriage for servoing the transducer to a reference position on the head carriage; and an electrical connection between said actuator and said coarse servo circuit for adjusting operation of the coarse servo circuit for feed forwarding signals from said actuator to the coarse servo circuit to move the head carriage faster when the relative position sensor indicates a greater than a predetermined relative displacement between said transducer and a head carriage.

22. In the invention set forth in claim 21, further including, in combination:

said position and velocity servo circuits supplying servo drive signals for controlling said actuator; and compare means in said switching means for receiving said servo drive signals and comparing the RMS values thereof for actuating the switching means to switch control of the actuator from the velocity servo circuit to the position servo circuit when the RMS values of the servo drive signals are equal.

23. In the invention set forth in claim 22, wherein said position error means includes:

each of said indicia being a track on the data storing disk and said target indicium being a target track;

a track counter which down counts to zero when reaching said target track and indicating when the transducer is said predetermined number of tracks from said target track;

and said track counter being connected to said compare means to respond to a track count equal to said predetermined number of tracks from said target track for activating the compare means to compare the servo drive signals of said position and velocity servo circuits.

24. In the invention set forth in claim 23, wherein said local position indication constitutes a sinusoidal alternation when the transducer traverses between two adjacent ones of said tracks with a zero crossing at the midpoint between the tracks; and said compare means being connected to said transducer for receiving the local position indication and being responsive to a one of the zero crossings and to said position error signal to activate the switching means to switch the mode of operation from the velocity servo circuit to said position servo circuit.

25. In the invention set forth in claim 24, wherein said compare means activates the switching means to switch control of the actuator at a velocity of the transducer with respect to the disk greater than a radial velocity of any run-out of said disk.

26. In a method of positioning a transducer along a path on a signal storing member wherein the path has a plurality of sensible spaced-apart location marks;

including the steps of:

detecting the relative position of said transducer along said path;

relatively moving the transducer along said path from said detected relative position toward a target relative position such that the detected and target relative positions are initially separated along said path by a first plurality of said marks;

during a first portion of said relative movement controlling the movement according to a predetermined velocity profile;

sensing for a predetermined range relative location along said path displaced from said target mark by a second plurality of said marks, said second plurality being less than said first plurality but greater than two;

upon sensing said range relative location, switching from said predetermined velocity profile to a predetermined position error profile for completing the relative movement of the transducer along said path to the target mark traversing said second plurality of marks; and stop locking the transducer and signal storing member at the target mark using a predetermined position reference signal.

27. In the method set forth in claim 26, further including the steps of:

in said sensing step, sensing both said predetermined velocity error profile and said predetermined position error profile and when the profiles indicate identical movement of the transducer, then in said switching step, switching from the predetermined velocity error profile to the predetermined position error profile for controlling motion of said transducer with respect to the signal storing member.

28. In the method set forth in claim 26, wherein the transducer is carried on a moving carriage with the transducer being relatively moveable with respect to the moving carriage along said path and the moving carriage being moveable also along said path;

further including the steps of:

sensing the relative position of the transducer with respect to a reference position with respect to the moving carriage; and continuously moving the moving carriage for causing the transducer to always be close to said reference position on the moving carriage as possible.

29. In the method set forth in claim 28, further including the steps of:

moving said transducer along the path over not more than said second plurality of said marks; and in such movements of less than said second plurality of marks controlling the movement of the transducer using only the predetermined position error profile.

30. A servo positioning system having a coarse actuator carrying a fine actuator, the fine actuator being movably mounted on the coarse actuator along a first axis, a frame supporting the coarse actuator for movement along the first axis, RPS position detection means operatively connected to the fine and coarse actuators for indicating the relative position with respect to a reference position relative of the fine actuator to the coarse actuator; absolute position detection means operatively connected to the frame and the fine actuator for indicating a relative position of the fine actuator to the frame;

the improvement including, in combination:

a first positioning servo loop connected to the fine actuator and to said absolute position detection means for supplying a servo drive signal to the fine actuator to control short relative motions between the fine actuator and the frame;

a velocity positioning servo loop connected to the fine actuator and to said absolute position detection means for supplying a servo drive signal to the fine actuator to control long relative motions between the fine actuator and the frame;

control means connected to said first and velocity positioning loops to switch control there between respectively for said short and small relative motions between said fine actuator controlling the actuator between said frame; and a second positioning servo loop connected to the coarse actuator and to said RPS position detection means for controlling motions of the coarse actuator such that the relative position of the fine actuator with respect to the coarse actuator during positioning motions of the fine actuator controlled by either said first and velocity positioning servo loops is continuously servoing toward said reference relative position.

31. The servo positioning system set forth in claim 30, further including, in combination:

feed forward means operatively intercoupling said fine actuator and said second positioning servo loop for supplying a servo positioning alteration signal such that said second positioning servo loop supplies a higher amplitude signal to coarse actuator for preventing the fine actuator from being displaced from said reference relative position greater than a predetermined distance whereby the coarse actuator moves faster during periods of time that that fine actuator is being strongly actuated by either of said first or velocity positioning servo loops.

32. In the servo positioning system set forth in claim 31, further including, in combination:

distance to go means in said control means for supplying a motion command indicating direction of motion and distance to go from a current relative position of the fine actuator and said frame as indicated by said absolute position detection means toward a target relative position of said fine actuator to said frame;

output means in the control means being connected to said distance to go means for receiving said motion command and supplying said motion command only to said first positioning servo loop when said distance to go is less than a predetermined range of motion from said target position and quiescing said velocity positioning servo loop for such motion and being further operative when said motion command indicates motion greater than said predetermined range to actuate the velocity positioning servo loop for an initial motion while quiescing the first positioning servo loop; and mode change means in the control means operatively coupled to said absolute detection means for receiving an indication therefrom that said relative position is actuating the fine actuator and causing said first position servo loop to complete the motion to the target relative position within said predetermined range.

33. In the servo positioning system set forth in claim 32, further including, in combination:

proximity means in said control means operatively coupled to said absolute position detection means for detecting an approach to said predetermined range and being responsive thereto for activating said first positioning servo loop to generate and supply a positioning servo drive signal in preparation for switching from said velocity positioning servo loop to the first positioning servo loop.

34. In a servo positioning system set forth in claim 33, further including, in combination:
said first positioning servo loop having a stop lock mode for maintaining relative position of the fine actuator with respect to said frame and a seek mode operative within said predetermined range and operating under a first positioning motion profile when switching from said velocity positioning servo loop to the first positioning servo loop including a profile beginning at an amplitude corresponding to the amplitude of the servo drive signal of the velocity positioning servo loop and declining to a reference potential usable in said stop lock mode; and
a second position motion profile when seeking from initial stop-lock position which increases an amplitude to a predetermined value at a target position and having means for reducing the profile to said reference potential at said target position.

35. In a servo positioning system as set forth in claim 33, further including, in combination:
said absolute position detection means supplying a digital number indicative of distance to go;
said control means being operatively coupled to said absolute position detection means for indicating a commanded distance to go and supplying the indication to said absolute position detection means;
said absolute position detection means, including down counting means, down counting from said commanded distance to go toward zero, which represents reaching a target position;
wherein each down count of said absolute position detection means is representative of an addressable stop-lock position of the fine actuator with respect to the frame as maintainable by said first positioning servo loop; and
means in the control means limiting said predetermined range to not being less than two of said stop lock positions.

36. In a servo positioning system set forth in claim 35, further including signal compare means in said control means and being operatively coupled to said first and velocity position servo loops for receiving the servo drive signals therefrom for comparing amplitudes thereof and indicating when the amplitudes are equal;
said compare means being operatively coupled to said absolute position detection means and responsive to said absolute detection means indicating a distance to go somewhat greater than said predetermined range to actuate said first positioning servo loop to supply a pseudo servo drive signal to the compare means for comparison with the servo drive signal received from said velocity positioning servo loop and indicating equality at about an extremity of said predetermined range; and
said compare means being connected to said control means for actuating the control means to switch between the velocity positioning loop and the first positioning servo loop to control the fine actuator.

37. In a servo positioning system set forth in claim 36, wherein said fine actuator carries a transducer capable of performing predetermined signal transducing functions:
a signal storing member movably supported on the frame and being disposed in working relationship to said transducer for enabling said signal transducing operation, said signal storing member being movably supported on the frame in a direction transverse to said first axis and said transverse movement including unwanted movements along said first axis;
said signal storing member having position indicating marks disposed along the first axis, said marks being sensible by said absolute positioning detection means; and
said fine actuator being moveable along the first axis in a manner to maintain said transducer in working operative relationship to said signal storing member irrespective of the amount of movement along the first axis of the transducer.

38. In a servo positioning system set forth in claim 37, wherein said signal storing member comprises a record disk rotatably mounted on said frame for rotation transversely to said first axis and including a plurality of circular record tracks identifiable by said absolute position detection means;
each of said tracks constituting one of said position indicating marks;
said transducer being a signal transducer in operative relationship to said rotating disk and said absolute position detection means being in operative relationship to said disk through said transducer such that the transducer not only senses data signals on the disk, but also said position indicating marks.

39. In a servo positioning system set forth in claim 38, wherein said transducer is a set of optical elements focussed on said disk surface for optically sensing said data signals and said marks; and
said disk being optically recordable and readable by said transducer means.

40. In a positioning servo circuit, the improvement, including, in combination:
position detector means for indicating a relative position between two members which are relatively moveable with respect to each other, a plurality of relative position indicating marks on said relatively moveable members which are sensible by said position detector means;
an actuator operatively coupled to said relatively moveable members for relatively moving same;
first and second servo positioning circuit means, each for supplying a servo drive signal to said actuator for relatively positioning the two relatively moveable members and being coupled to the position detector means for receiving said indication of relative position for controlling the relative positioning of said relatively moveable members;
output means electrically coupled to both the circuit means for receiving a servo drive signal therefrom and to said actuator for supplying one of said servo drive signals thereto;
command means for actuating the first servo positioning circuit means to supply a first servo drive signal to said output means for relatively moving the relatively moveable members toward a predetermined relative position and for actuating the second servo positioning circuit means to generate a second servo drive signal as if it were relatively moving the relatively moveable members toward said predetermined relative position; and
mode switch means coupled to said first and second servo positioning circuit means, to said position detector means and to said output means for receiving the servo drive signals from both said servo positioning circuit means and connected to said command means for coupling said first servo drive signals to the output means and being jointly responsive to said servo drive signals and to said indication of relative position to substitute said second servo drive signal for the first servo drive signal at said output means when a given number of said position indicating marks are disposed between said predetermined relative position and a current indicated relative position, said given number being greater than one.

41. In a positioning servo circuit set forth in claim 40, further including, in combination:

said first servo positioning circuit means having a positioning control capability of initiating and controlling short relative motions of said two relatively moveable members and for maintaining a stop lock relationship between the two relatively moveable members with respect to any one of said position indicating marks; and said second servo positioning circuit means having a capability of relatively moving said two relatively moveable members over a greater number of said position indicating marks during a given single movement, but not having a capability of completing the movement to a target one of said position indicating marks and further having the capability of relatively moving the two relatively moveable members at a faster speed than said first servo positioning circuit means moves said objects during short relative motions.

42. In a positioning servo circuit set forth in claim 40, wherein said second servo positioning circuit means includes means establishing motion control using a velocity profile.

43. In a positioning servo circuit set forth in claim 40, further including, in combination:

said position detector means indicating said relative position of said members by an electrical digital output signal indicative of a distance from a predetermined target one of said position indicating marks, having means for down counting said digital output as the two relatively moveable members approach said target relative position of said target position indicating mark, and supplying a proximity signal indicative when said first servo positioning circuit means can complete any motion or start any motion which is one of said short relative motions and;

compare means in said mode switch means operatively coupled to said first and second servo positioning circuit means and to said position detector means for responding to said proximity signal to receive the servo drive signals from both of said first and second servo positioning circuit means for comparing same and for indicating a time when the amplitudes of said servo drive signals are equal for switching the coupling from said second servo positioning circuit means to said first servo positioning circuit means for completing the movement as a short relative motion.

44. In a positioning servo circuit set forth in claim 43, wherein said compare means includes amplitude compare means for comparing the signal amplitudes of said servo drive signals.

45. In a positioning servo system having a signal storing member, a frame movably mounting a signal storing member along a predetermined path, a first actuator on the frame and connected to a fine carriage, the fine carriage being movably mounted on the frame for carrying a transducer along a given path which extends transversely to a said predetermined path and being disposed with respect to the signal storing member to relatively move the transducer and signal storing member along said given path keeping the transducer and signal storing member in operative juxtaposition such that the signal storing member cooperates with the transducer to perform desired machine operations, error means coupled to the transducer and the signal storing member for generating and supplying a position error signal (PES) which indicates a relative position error between the signal storing member and the transducer with respect to a desired relative position between the transducer and signal storing member;

the improvement including, in combination:

an electronic switch means having an output portion being operatively connected to the actuator and first and second input portions for receiving servo drive signals;

a first position servo circuit means having a stop lock mode and a seek mode and being operatively connected to said first input portion and to said error means for receiving PES and being responsive to PES for actuating said actuator to relatively move the transducer in said seek mode within a first range of motion with respect to said desired relative position which range is outside of operation of said position servo circuit means in said stop lock mode and to maintain said relative position of said transducer and signal storing member in said stop lock mode;

a velocity servo circuit means operatively connected to said second input portion and to said error means for receiving PES and having a command input portion for receiving commands to actuate the actuator to relatively move the transducer and the signal storing member from said desired relative position toward but not reaching a target relative position along said given path, said target and desired relative positions being separated along said given path a distance greater than said first range;

command means operatively connected to said electronic switch means nd to said command input portion for actuating the electronic switch to receive inputs for the actuator through said second input portion and not through the first input portion and for actuating the velocity servo circuit means to cause the actuator to relatively move said transducer and said signal storing member toward said target relative position; and restore means operatively connected to both said servo circuit means and to said electronic switch means for responding to predetermined operational states of both said servo circuit means before said transducer and signal storing member have reached an immediate proximity of said target relative position for actuating said electronic switch means to again receive input through said first input portion and not the second input portion at the onset of reaching the first range and such that the position servo circuit means completes controlling the actuator during the relative motion of said transducer and signal storing member to said target relative position and then institutes stop-lock mode upon reaching the target relative position.

46. In the positioning servo system of claim 45, further including, in combination:
- a coarse carriage movably mounted on the frame for movement along said given path, having a reference mark thereon and carrying said fine carriage along said given path, and carrying said first actuator;
- relative position sensing means on said coarse carriage and operatively coupled to said fine carriage for indicating the relative position of a fine carriage with respect to said reference mark and supplying a position error signal;
- a second position servo circuit means operatively coupled to said relative position sensor for receiving said position error signal and being responsive to the position error signal for supplying the coarse servo drive signal;
- a coarse actuator on the frame operatively coupled to said coarse carriage and to said second position servo circuit means for receiving said coarse servo drive signal and responsive thereto for causing the actuator to move the coarse carriage along the given path for reducing the position error signal from the relative position sensor to zero, irrespective of whether said first position servo circuit means or said velocity servo circuit means by actuating the first actuator.

47. In the positioning servo system set forth in claim 46, further including, in combination:
- feed forward means operatively electrically coupling said first actuator to said second position servo circuit means for supplying a signal to said second position servo circuit means in proportion to the signal received by the first actuator from said electronic switch means output portion whereby the coarse actuator actuates the coarse carriage for faster motion in proportion to the displacement of the transducer from said reference mark.

48. In the positioning servo system set forth in claim 47, further including, in combination:
- a plurality of position indicia on said signal storing member in sensible relationship to the transducer for indicating the relative position of the transducer to the signal storing member and sensible by the error means generating said PES; and
- mode switch means in said first position servo circuit means operatively coupled to said error means for responding to PES when said first position servo circuit means is in said seek mode within the first range of motion and the relative position of said transducer and said signal storing member along said given path is about one-fourth the space between two adjacent ones of said marks from a target one of said marks from a desired relative position of said transducer and said signal storing member.

49. In the positioning servo system set forth in claim 48, further including, in combination:
- said signal storing member being an optical record medium movably mounted along said predetermined path which is transverse to said given path; and
- an optical lens in said transducer in optical communication with the record medium for optically receiving signals recorded on the record medium and for optically sensing said marks.

50. In the positioning servo system set forth in claim 49, wherein said optical record medium is a circular record storage disk rotatably mounted on the frame for rotation transverse to said given path, and wherein said predetermined path is radially of said disk; and
- a plurality of concentric record tracks on the record storage disk each of which include one of said marks for indicating the radial position of the transducer with respect to the record storage disk.

51. In the positioning servo system set forth in claim 50, wherein said first position servo circuit means having first and second positioning motion profiles, a first of the motion profiles causing relative motion of the work object with respect to the record storage disk beginning at an amplitude corresponding to the amplitude of a servo drive signal supplied by said velocity positioning circuit means and declining to a reference potential suitable for use in said stop-lock mode; and
- said second position profile beginning at said reference potential in said stop-lock mode and increasing to a maximal value as position error increases and then reducing immediately to said reference potential representative of arriving at said target position.

52. In a positioning servo system having a first actuator movably mounted on a support and carrying a transducer with respect to the support and a signal storing member, said signal storing member and the support being mounted on a common frame such that the transducer is moveable by the actuator along a predetermined path along the signal storing member continuously in an operative position, a plurality of path position indicating marks on the signal storing member evenly spaced along the path and means in the transducer for sensing the marks, error means operatively connected to the sensing means for generating a position error signal (PES) indicative of the relative position of the transducer with respect to the marks disposed along said predetermined path;

the improvement including, in combination:
- means for supplying movement commands for relative movements of said transducer with respect to the signal storing member including an indication of direction and a number of said marks to be traversed in the commanded movement from a mark currently being senses by said sensing means;
- command directing means connected to the supplying means for generating a first long seek command indicating movement of the transducer to a target position along said path only when said number exceeds a predetermined number greater than two and a second short seek command when said number is less than said predetermined number;
- velocity circuit means having a velocity control and being connected to said actuator for supplying a servo drive signal to said actuator and being connected to the directing means for responding to the first long seek command to cause the actuator to move the transducer in a direction indicated by the long seek command while using said velocity control;
- first positioning circuit means having a positioning seek and position maintenance control and being connected to said actuator for supplying a servo drive signal thereto and being connected to the directing means for responding to the second short seek command to cause the actuator to move the transducer in a direction indicated by the second short seek command using said positioning control and having a stop-lock mode in the positioning control for commanding the actuator to maintain current position of the transducer with respect to the signal storing member, stop means operatively connected to the error means by responding to PES to institute the stop-lock mode at said target position; and mode changing means connected to said velocity circuit means and to said first positioning circuit means for measuring the circuit operations of said velocity control and said positioning control and when the measured operations indicate that the transducer is being moved by the actuator using the velocity control and the transducer is not more than said predetermined number of marks from an end of the commanded movement inactivating the velocity control and activating the positioning control to complete the movement of the transducer including moving the transducer over at least one mark intermediate a current position of the transducer and then end the commanded movement in the stop-lock mode.

53. In the positioning servo system set forth in claim 52, further including, in combination:

a frame in said system;

said frame movably supporting said support for movement along said predetermined path in reciprocating motions;

positioning circuit means on the frame;

a coarse actuator mounted on the frame and to the support for moving the support reciprocally along said predetermined path and being operatively connected to said second positioning circuit means for enabling the second positioning circuit means to control the movement of the support along the predetermined path;

a relative position sensor mounted on the support and operatively coupled to said transducer for indicating the relative position of the transducer with respect to the support and being connected to said second positioning circuit means for indicating a position error such that the second positioning circuit means continuously servos for making a relative position error equal to zero such that the moveable support continuously follows the motion of said transducer.

54. In the positioning servo system set forth in claim 53, further including, in combination:

feed forward means operatively intercoupling said first and second positioning servo circuit such that said first positioning servo circuit means supplies the servo positioning alteration signal to said second positioning servo circuit means whereby said second positioning servo circuit means supplies a higher amplitude electrical drive signal to said coarse actuator whenever the transducer is displaced from a reference relative position on the support greater than a predetermined distance for causing the coarse actuator to move said support along said predetermined path faster during periods of time for preventing the transducer from having a greater than a predetermined relative displacement with respect to the support.

55. In the positioning servo system set forth in claim 54, further including, in combination:

proximity means in said load changing means and connected to said error means for responding to PES to detect an approach by said transducer to a mark which is displaced from the commanded movement by said predetermined number of marks for activating the first positioning servo circuit means to generate and supply a positioning servo drive signal in preparation for switching from the velocity positioning circuit means to the first positioning circuit means and including means for quiescing the operation of the first positioning circuit means when the velocity circuit means is operative and before proximity of said transducer reaching said predetermined number of marks from an end of the commanded movement is detected.

56. In the servo positioning system set forth in claim 55, further including, in combination:

said work or element being an optical disk rotatably mounted on the frame for rotation across said predetermined path;

said transducer including an optical beam steering means for sweeping a beam along the predetermined path with the position of the beam on the optical disk being the relative position of the transducer with respect to said support; and said optical disk having a plurality of concentric record tracks facing said transducer and including physical indicating means constituting said indicating marks.

57. In a positioning servo for moving a transducer along a predetermined travel path on a signal storing member, a plurality of spaced-apart marks being disposed on the signal storing member along said path for indicating a like plurality of positions of said transducer on the path;

the improvement including, in combination:

a position detector coupled with the transducer and said signal storing member for detecting and indicating position of the transducer with respect to a closest one of said marks and supplying a position error signal (PES) indicating said relative position;

servo circuit means coupled to the detector for receiving PES and having a summer circuit for combining the received PES with a command signal for causing the servo circuit means to move the transducer to a target position in accordance with the command signal by combining the command signal with PES in the summer circuit; and first, second and third command means coupled to the summer circuit for respectively supplying a command signal as a predetermined reference potential for causing the servo circuit means to position the transducer at a current one of the marks, to move the transducer from said current one mark to another mark by a command signal having a sawtooth shape beginning with said reference potential and decreases toward zero at said target position and to supply a command signal when the transducer is in motion over a second one of the marks toward a target one of the marks with intermediate marks between the second and target ones of the marks with a command signal having a predetermined maximum amplitude at the second one of the marks and decreasing in amplitude to said reference potential at a time when the transducer is at said target position.

58. In a method of relatively moving first and second relatively moveable members along a predetermined path of relative movement from a first relative position to a second relative position displaced from the first relative position a predetermined distance, path location indicating marks on the second object;

including the steps of:
- determining the number of said marks to be moved to achieve a predetermined relative movement across said predetermined distance;
- if said number is greater than a first number, then firstly relatively moving said members according to a predetermined velocity profile until a relative position indicated by a second plurality of marks from said second relative position is reached, then changing control of the movement to a first predetermined positioning control profile which ends in a stop-lock control at said second relative position, said second plurality being less than said first number but greater than two; and
- if said number is less than said first number, then relatively moving said members using a second predetermined positioning control profile including a slope negative with respect to said first predetermined positioning control profile and ending at said stop-lock control.

59. In a positioning control for relatively positioning first and second relatively moveable members, the first member carrying a third member relatively moveable with respect to the first member, said first member having a reference position at which the third member is to be maintained, the positioning control operating to relatively position the first and third members from a first predetermined relative position to a target relative position, a frame movably mounting said first and second members;

the improvement including, in combination:
- a first position sensor on said first member and operatively coupled to said third member for sensing the relative position therebetween with respect to said reference position and generating a relative position signal (RPS) for indicating displacement of said third member from said reference position signal (RPS);
- a second position sensor operatively coupled between said first and second members for sensing the relative position therebetween and for indicating the relative position as a position error signal (PES);
- fine and coarse actuators respectively mounted on said first member and on said frame for respectively carrying said third and first members along a common movement path on said second member;
- position indicating marks on the second member and spaced apart along said path in a sensible relationship to said second position sensor such that the second position sensor supplies PES when the third member is traversing said path which is a PES having a single alternation intermediate two adjacent ones of said marks;
- a first positioning circuit means coupled to said fine actuator for actuating same to move said third member along said path from said first predetermined relative position of said first and third members toward the target relative position but not for stop-locking the first and third members at said target relative position;
- a second positioning servo circuit means coupled to said fine actuator for actuating same to move said third member along said path over a limited number of said marks and for stop-locking the third member over one of said marks, including marks respectively at said first predetermined relative position and said target relative position;
- electronic switch means electrically interposed between both said servo circuit means and said fine actuator for selectively coupling one and only one of the servo circuit means to the fine actuator;
- a third positioning servo circuit means coupled to said coarse actuator and to said first position sensor for moving the first member along the path for returning the third and first members to said reference relative position via either said first or second position servo circuit means;
- control means connected to said switch means for actuating same to first connect said first positioning circuit means to said fine actuator to move the third member from said first relative position toward a second relative position between said second and third members, said second relative position being displaced along said path such that a first plurality of said marks are intermediate said first and second relative positions, progress sensing means in the control means and operatively associated with said path for sensing progress of said movement of the third member along said path and supplying a mode change signal when the movement of said first member with respect to said second member is a second plurality of marks greater than two and less than said first plurality of marks from said second relative position, said control means in response to said mode change signal actuating said switch means to disconnect said first positioning circuit means from and connect said second positioning servo circuit means to said fine actuator.

* * * * *